United States Patent
Ramappan et al.

(10) Patent No.: US 8,322,324 B2
(45) Date of Patent: Dec. 4, 2012

(54) SYSTEM AND METHOD FOR CONTROLLING TRANSIENT SWITCHING BETWEEN HCCI MODE AND SI MODE OF AN ENGINE

(75) Inventors: Vijay Ramappan, Novi, MI (US); Peter Kafarnik, Eltville-Erbach (DE); Allen B. Rayl, Waterford, MI (US); Jonathan T. Shibata, Whitmore Lake, MI (US)

(73) Assignee: GM Global Technology Operations LLC

( * ) Notice: Subject to any disclaimer, the term of this patent is extended or adjusted under 35 U.S.C. 154(b) by 449 days.

(21) Appl. No.: 12/576,585

(22) Filed: Oct. 9, 2009

(65) Prior Publication Data

US 2010/0275877 A1 Nov. 4, 2010

Related U.S. Application Data

(60) Provisional application No. 61/174,211, filed on Apr. 30, 2009.

(51) Int. Cl.
- *F02B 17/00* (2006.01)
- *F02B 3/00* (2006.01)
- *F02B 5/00* (2006.01)
- *F02M 43/00* (2006.01)

(52) U.S. Cl. ........ 123/295; 123/299; 123/304; 123/305; 701/103; 701/105

(58) Field of Classification Search ................. 123/295, 123/305, 299, 406.47, 90.15, 90.16, 90.17, 123/90.11, 443, 346, 300, 304, 436; 701/102, 701/103, 104, 105, 106, 108
See application file for complete search history.

(56) References Cited

U.S. PATENT DOCUMENTS

| | | | | |
|---|---|---|---|---|
| 6,390,054 | B1 * | 5/2002 | Yang | 123/295 |
| 6,561,157 | B2 * | 5/2003 | zur Loye et al. | 123/295 |
| 6,725,825 | B1 * | 4/2004 | Kurtz et al. | 123/295 |
| 6,752,123 | B2 * | 6/2004 | Unger et al. | 123/305 |
| 7,213,566 | B1 * | 5/2007 | Jankovic | 123/302 |
| 7,240,480 | B1 * | 7/2007 | Brevick et al. | 60/280 |
| 7,240,659 | B2 * | 7/2007 | Yang | 123/295 |
| 7,274,986 | B1 * | 9/2007 | Petridis et al. | 701/102 |
| 7,290,521 | B2 * | 11/2007 | Ogawa et al. | 123/299 |
| 7,360,523 | B2 * | 4/2008 | Sloane et al. | 123/305 |
| 7,367,310 | B2 * | 5/2008 | Kakuya et al. | 123/295 |
| 7,717,084 | B2 * | 5/2010 | Kurotani et al. | 123/295 |
| 7,730,717 | B2 * | 6/2010 | Ogawa et al. | 60/285 |
| 7,769,525 | B2 * | 8/2010 | Kakuya et al. | 701/103 |
| 2004/0182359 | A1 * | 9/2004 | Stewart et al. | 123/295 |
| 2006/0196466 | A1 * | 9/2006 | Kuo et al. | 123/295 |
| 2007/0193557 | A1 * | 8/2007 | Brevick et al. | 123/295 |
| 2007/0233354 | A1 * | 10/2007 | Yang | 701/104 |
| 2008/0066713 | A1 * | 3/2008 | Megli et al. | 123/295 |
| 2008/0257306 | A1 * | 10/2008 | Chen et al. | 123/350 |
| 2009/0229564 | A1 * | 9/2009 | Kang et al. | 123/295 |
| 2009/0229565 | A1 * | 9/2009 | Kang et al. | 123/295 |
| 2010/0162991 | A1 * | 7/2010 | Ramappan et al. | 123/27 R |

* cited by examiner

*Primary Examiner* — Stephen K Cronin
*Assistant Examiner* — Raza Najmuddin

(57) ABSTRACT

A control system and method for operating an engine includes an HCCI mode control module operating an engine in a homogeneous charge compression (HCCI) mode. The control system also includes a difference module determining an actual difference between a desired torque amount and a spark ignition (SI) threshold. An SI mode control module operates the engine in a SI state when the actual difference is above a threshold band. A HCCI mode control module operates the engine in the HCCI mode for a predetermined time when the actual difference is within the torque threshold band. The HCCI mode control module operates the engine in the HCCI mode when the actual difference is below the torque threshold band.

21 Claims, 5 Drawing Sheets

SYSTEM AND METHOD FOR CONTROLLING TRANSIENT SWITCHING BETWEEN HCCI MODE AND SI MODE OF AN ENGINE

CROSS-REFERENCE TO RELATED APPLICATIONS

This application claims the benefit of U.S. Provisional Application No. 61/174,211, filed on Apr. 30, 2009. The disclosure of the above application is incorporated herein by reference in its entirety.

FIELD

The present disclosure relates to engine control systems, and more particularly to engine control systems for engines operating in both spark ignition and homogenous charge compression ignition (HCCI) modes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines may be operated in a spark ignition (SI) mode and a homogeneous charge compression ignition (HCCI) mode. The HCCI mode involves compressing a mixture of fuel and an oxidizer to a point of auto-ignition. One of the modes may be selected based on engine speed and load. In the HCCI mode, ignition occurs at several locations at a time, which makes a fuel/air mixture burn nearly simultaneously. The HCCI mode performs close to an ideal Otto cycle, provides improved operating efficiency and generates lower emission levels as compared to SI mode. However since there is no direct initiator of combustion, the ignition process tends to be more difficult to control.

Under certain driving maneuvers, depending on the driver requested torque, it is possible to exit HCCI zone for very short intervals and re-enter HCCI operation. This type of frequent mode transitions between SI and HCCI may compromise fuel efficiency and emissions.

SUMMARY

The engine control system according to the present disclosure improves drivability and minimizes the unnecessary mode transitions by delaying transitions from HCCI mode to SI mode in a certain torque band. This results in improved emissions and efficiency due to longer operation in HCCI mode.

In one aspect of the disclosure, a method of controlling an engine includes operating an engine in a homogeneous charge compression (HCCI) mode, determining a difference between a spark ignition (SI) torque threshold and a desired torque amount, when the difference is above a torque threshold band, operating the engine in an SI state and, when the difference is within the torque threshold band, operating the engine in the HCCI mode for a predetermined time.

In another aspect of the disclosure, a control system and method for operating an engine includes an HCCI mode control module that operates an engine in a homogeneous charge compression (HCCI) mode. The control system also includes a difference module determining an actual difference between a spark ignition (SI) torque threshold and a driver desired torque amount. An SI mode control module operates the engine in an SI state when the actual difference is above a threshold band. An HCCI mode control module operates the engine in the HCCI mode for a predetermined time when the actual difference is within the threshold band.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

Figure 1A:
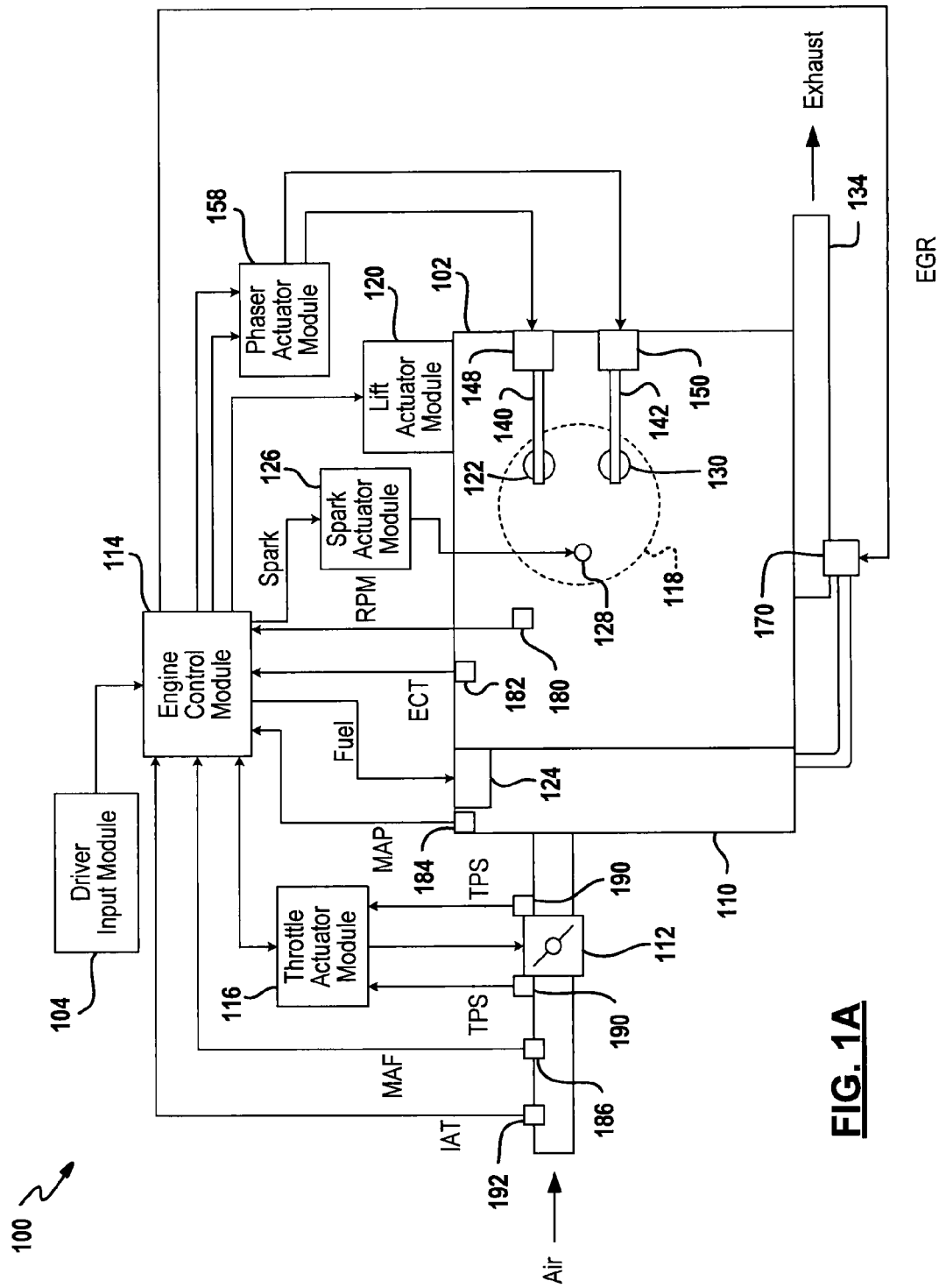
FIG. 1A is a functional block diagram of an engine control system that operates in SI and HCCI combustion modes according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The engine control system according to the present disclosure operates the gasoline engine in the SI mode and the HCCI mode. The HCCI mode reduces fuel consumption but is only available over a limited range of engine torques and speeds. For example only, the engine control system may operate the engine in the HCCI mode at low to mid loads and low to mid engine speeds. The engine control system may operate the engine in the SI mode at other loads and engine speeds.

The engine may be a direct injection gasoline engine and may be selectively operated in a stratified operating mode during the transitions. To operate in the stratified operating mode, the fuel injectors inject a fraction of the total fuel just before the ignition event near cylinder top dead center (TDC). This approach provides a stoichiometric charge in that area that ignites easily and burns quickly and smoothly.

Transitions between the HCCI mode and SI mode should appear seamless to the driver, minimize engine emissions and minimize fuel consumption losses. The present disclosure reduces unnecessary transient switching between HCCI mode and SI mode.

During HCCI operation, the intake manifold pressure may be near atmospheric pressure. Transitions into and out of HCCI involve changes to intake manifold pressure and valve lift. These changes tend to cause sudden changes in air charge supplied to the cylinders. As a result, undesirable changes in engine torque will occur if not properly managed.

Referring now to FIG. 1A, a functional block diagram of an exemplary engine system 100 is presented. The engine system 100 includes an engine 102 that combusts an air/fuel mixture to produce drive torque for a vehicle based on a driver input module 104. The engine may be a direct ignition engine. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The lift actuator module 120 may switch between high and low lift on their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. Additionally, the lift actuator module 120 controls the amount of lift, which may be adjusted hydraulically or using other methods.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The ECM 114 may calculate measured air per cylinder (APC) based on the MAF signal generated by the MAF sensor 186. The ECM 114 may estimate desired APC based on engine operating conditions, operator input or other parameters.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance or retard. Other actuators include the EGR valve 170, the phaser actuator module 158, the fuel injection system 124, and the lift actuator module 120. The term actuator position with respect to these actuators may correspond to manifold absolute pressure, EGR valve opening, intake and exhaust cam phaser angles, and air/fuel ratio, respectively.

Figure 1B:
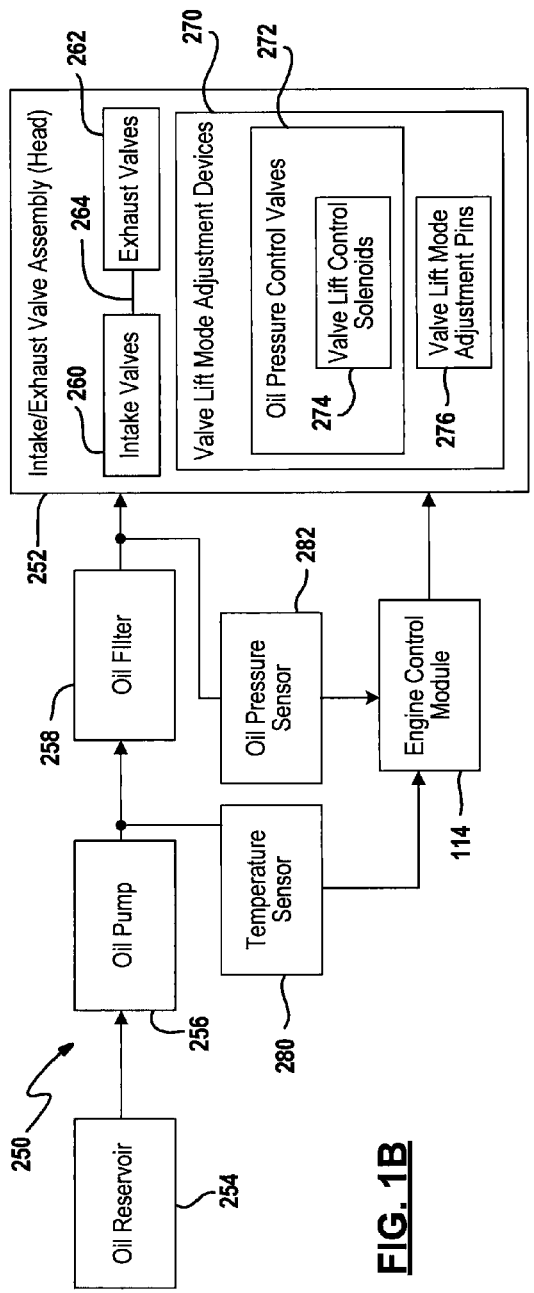
FIG. 1B is a functional block diagram of an exemplary valve lift adjustment system.

Referring now to FIG. 1B, a functional block diagram of a valve lift control circuit 250 is shown. The valve lift control circuit 250 includes an intake/exhaust valve assembly 252 that receives oil from an oil reservoir 254 via an oil pump 256. The oil is filtered through an oil filter 258 prior to reception by the valve assembly 252. The control module controls lift operation of intake and exhaust valves 260, 262 of the valve assembly 252.

The valve assembly 252 includes the intake and exhaust valves 260, 262, which have open and closed states and are actuated via one or more camshafts 264. A dedicated intake camshaft and a dedicated exhaust camshaft may be included. In another embodiment, the intake and exhaust valves 260, 262 share a common camshaft. When in an open state the intake and exhaust valves 260, 262 may be operating in various lift states.

The valve assembly 252 also includes valve lift state adjustment devices 270. The lift state adjustment devices 270 may include oil pressure control valves 272 and valve lift control valves, such as solenoids 274. Other lift state adjustment devices 276, such as lift pins, levers, rockers, springs, locking mechanisms, tappets, etc may be included.

The valve lift control circuit 250 may include an oil temperature sensor 280 and/or an oil pressure sensor 282. The control module signals the oil pressure control valves 272 based on temperature and pressure signals received from the temperature and pressure sensors 280, 282.

Figure 1C:
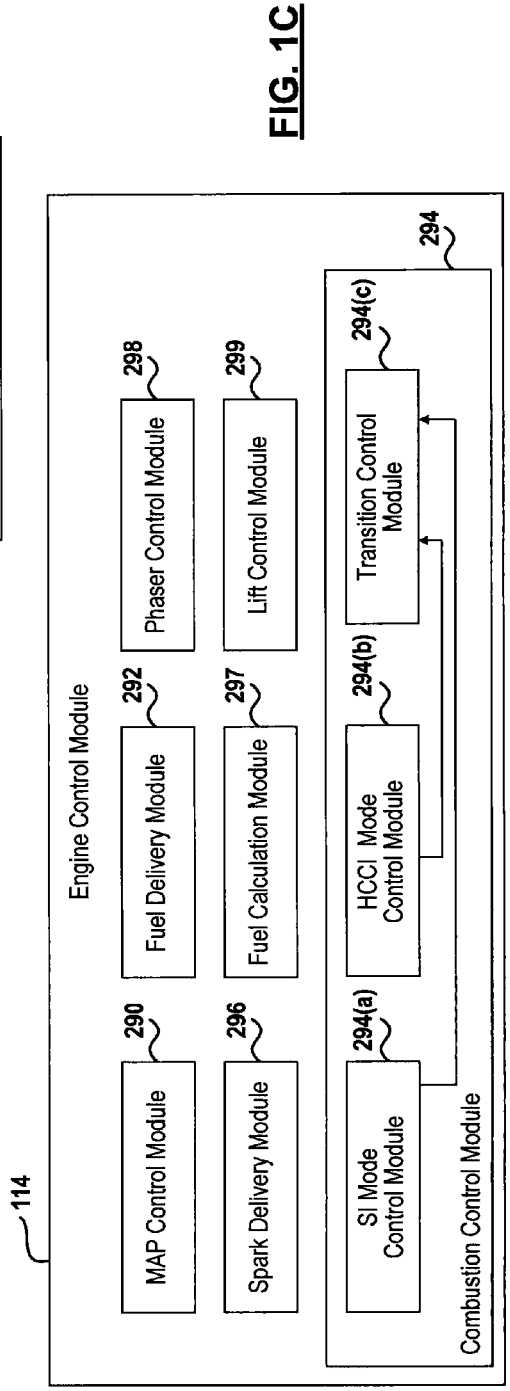
FIG. 1C is a functional block diagram of an exemplary engine control module.

Referring now to FIG. 1C, the engine control module 114 may comprise a map control module 290 having a MAP control mode (MM). The MM can be set to SI and HCCI modes. The engine control module 114 comprises a fuel delivery module 292 having a fuel delivery mode (FM). The fuel delivery module 292 may switch the FM between SI and various HCCI modes. The fuel delivery module 292 may determine the manner, timing and/or amount of fuel delivery.

The engine control module 114 comprises a combustion control module 294 having a combustion mode (CM). The combustion module 294 may switch the CM between SI, HCCI and transition modes and may include an SI control module 294(*a*), an HCCI control module 294(*b*) and transition control module 294(*c*).

The engine control module 114 comprises a spark delivery module 296 having a spark delivery mode (SM). The spark delivery module 296 may switch the SM between SI, SI with retard, stratified and HCCI modes. The spark delivery module 296 may determine the timing and duration of spark.

The engine control module 114 comprises a fuel calculation module 297 having a fuel calculation mode (FC). The fuel calculation module 297 may switch the FC between air lead and fuel lead modes. In air lead mode, fuel is controlled based on air. In fuel lead mode, air is controlled based on the measured or delivered fuel.

The engine control module 114 comprises a phaser control module 298 having a phaser control mode (PM). The phaser control module 298 may switch the PM between SI and HCCI modes. The phaser control module 298 may determine cam phasing.

The engine control module 144 comprises a lift control module 299 having a lift control mode (LM). The lift control module 299 may switch the LM between high and low valve lift modes.

Figure 1D:
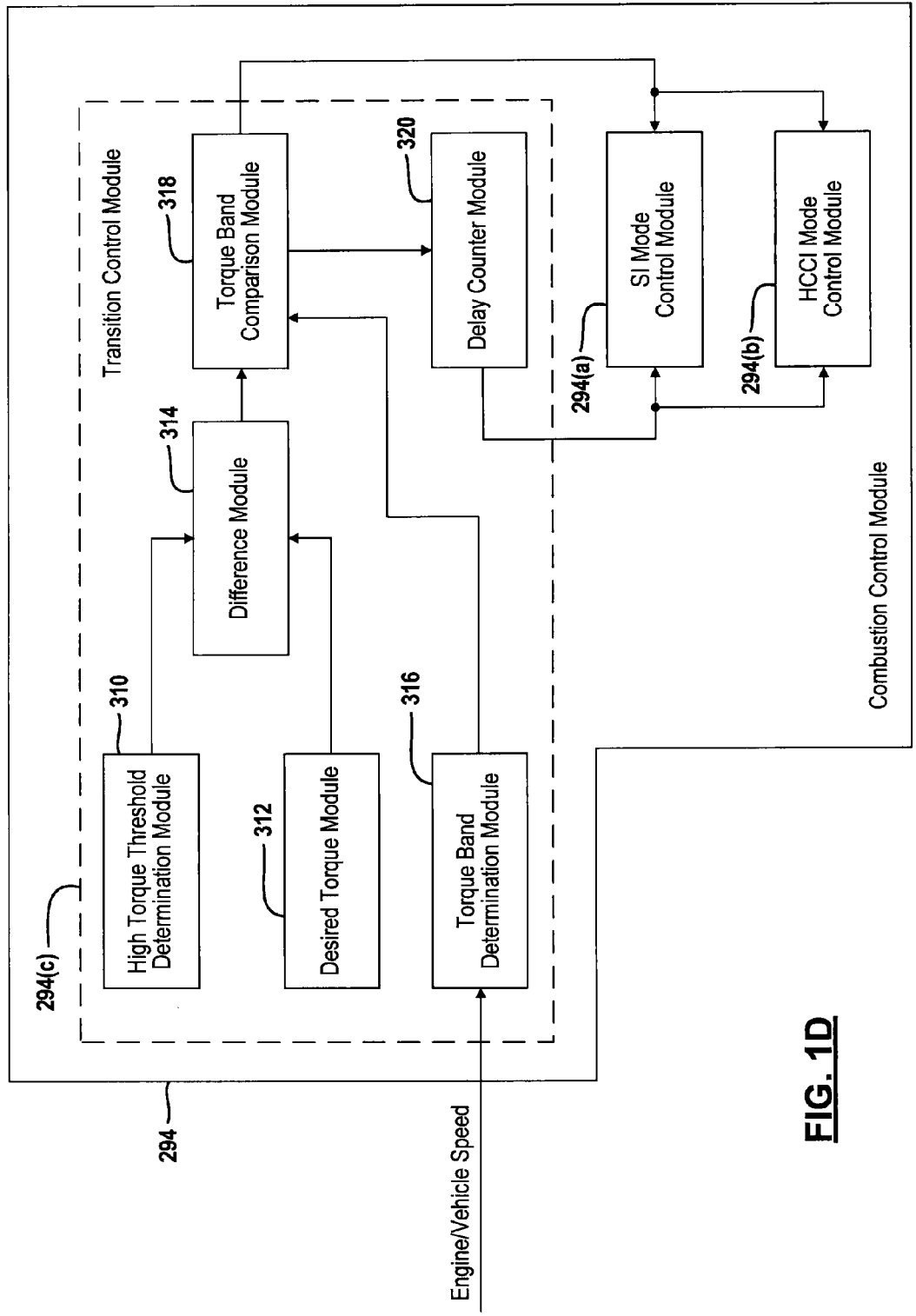
FIG. 1D is a block diagrammatic view of the HCCI transition control module of FIG. 1C.

Referring now to FIG. 1D, the transition control module 294(*c*) of the combustion control module 294 is illustrated in further detail. The transition control module 294(*c*) includes a high torque threshold determination module 310. The high torque threshold determination module 310 may generate a high torque threshold corresponding to a transition between the HCCI mode and the SI mode. The high torque threshold may be set based upon many factors including the engine and various operating conditions of the vehicle. The high SI fuel threshold may be calibratable.

A desired torque module 312 determines the desired torque. The desired torque may be determined from the accelerator pedal and from various other compensation factors due to other loads such as the air-conditioning load and the like.

The high torque threshold from the high torque threshold determination module 310 and the desired torque are used in a difference module 314. Thus, a difference between the high torque threshold determination module and the desired torque is determined in the difference module 314.

A torque band determination module 316 uses the engine or vehicle speed to determine a torque threshold band. The torque threshold band from the torque band determination module 316 and the torque difference from the difference module 314 are provided to a torque band comparison module 318. The torque band comparison module 318 compares the torque difference to the torque threshold band to determine whether the difference is within the torque threshold band. When the difference is greater than the torque band, control may be switched into the SI control mode of block 294(*a*). When the difference is within the torque threshold band, the HCCI mode may be maintained in the HCCI mode control 294(*b*). When the difference is within the torque threshold band, a delay counter module 320 may provide a delay for the system for switching into the SI mode from the HCCI mode control.

The delay counter module 320 may continually monitor the changing difference values in the difference module and when the difference is outside of the torque band, the delay counter module 320 may cause the appropriate SI mode or HCCI mode to be entered into. However, the delay counter module 320 maintains the control in an HCCI mode until the counter in the counter module exceeds a threshold value and when a torque difference greater than the torque band is not detected before the counter expires. When the delay counter expires, the SI mode is commanded and the engine is operated in the SI mode. If the delay counter detects that the torque difference is outside of the band, the appropriate SI mode or HCCI control mode are initiated.

Figure 2:
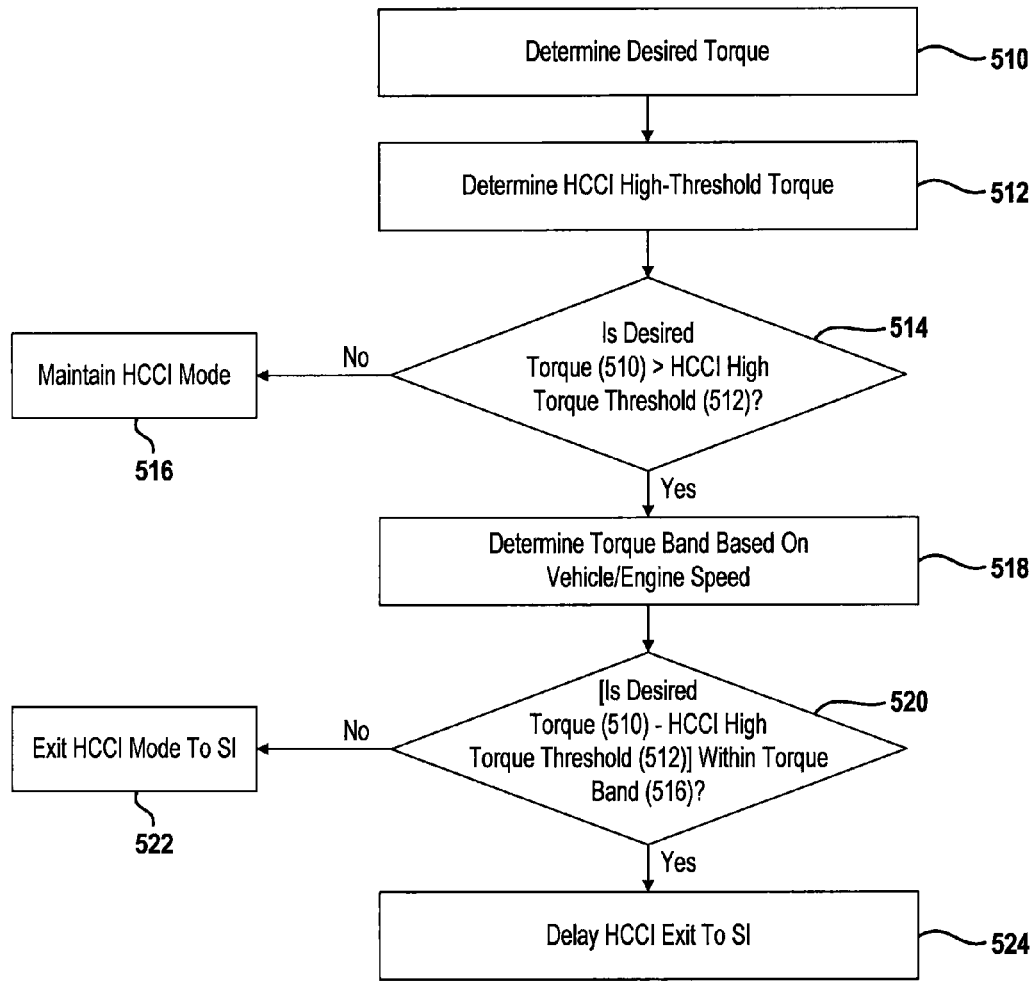
FIG. 2 is a plot of a method for controlling the engine according to the present disclosure.

Referring now to FIG. 2, a method for controlling the engine according to the present disclosure is set forth. This algorithm runs while the vehicle is operating in HCCI mode. In step 510, the desired torque is determined. The desired torque may be obtained from the accelerator pedal and other compensation factors, such as other loads on the engine. It should be noted that in the present example, a desired torque is used as the threshold and the desired value. However, the desired torque may be replaced by fuel amounts. The fuel amounts are directly related to the amount of torque desired since the torque is obtained by providing fuel to the engine.

In step 512, an HCCI high-threshold torque is determined. The HCCI high-threshold torque may be fixed or may be adjusted based upon various vehicle operating conditions. The high HCCI torque threshold may also be a calibratable number. In step 514, the desired torque is compared with the HCCI high-threshold torque. If the desired torque is not greater than HCCI high-threshold torque, HCCI operation is maintained as shown in step 516.

If the desired torque is greater than HCCI high-threshold torque, in step 518, a torque band based upon the vehicle or engine speed is determined. The torque band may modify the HCCI operating region. In step 520, the difference between desired torque 510 and HCCI high torque threshold 512 is compared with the torque band 518.

If the difference between desired torque 510 and HCCI high torque threshold 512 exceeds the torque band 518, SI mode is entered in step 522. When the difference is above the torque band 518, it is clear that the driver's intentions are for providing more torque to the vehicle and therefore SI mode is entered immediately.

When the difference between desired torque 510 and HCCI high torque threshold 512 is within the torque band 518, HCCI operation exit to SI mode is delayed in step 524.

A countdown or count-up timer delay timer may be used to achieve the delay. The delay timer, if fully used, provides a delay from changing the operation of the engine from an HCCI operation to an SI operation. This allows the engine to operate in the HCCI mode longer when the accelerator pedal is dithering without a clear intent to provide an additional amount of torque from the engine. This delay timer could also be a delay based on cylinder events and achieve the necessary delay as described before.

It is possible that during this delay period, the desired torque may decrease to a value below the HCCI high threshold torque and consequently resetting the delay counter and allowing HCCI operation. It is also possible that during this delay period, the difference between desired torque 510 and HCCI high torque threshold 512 may exceed the torque band 518 and SI mode is immediately entered in step 522 and the delay counter is reset.

Figure 3:
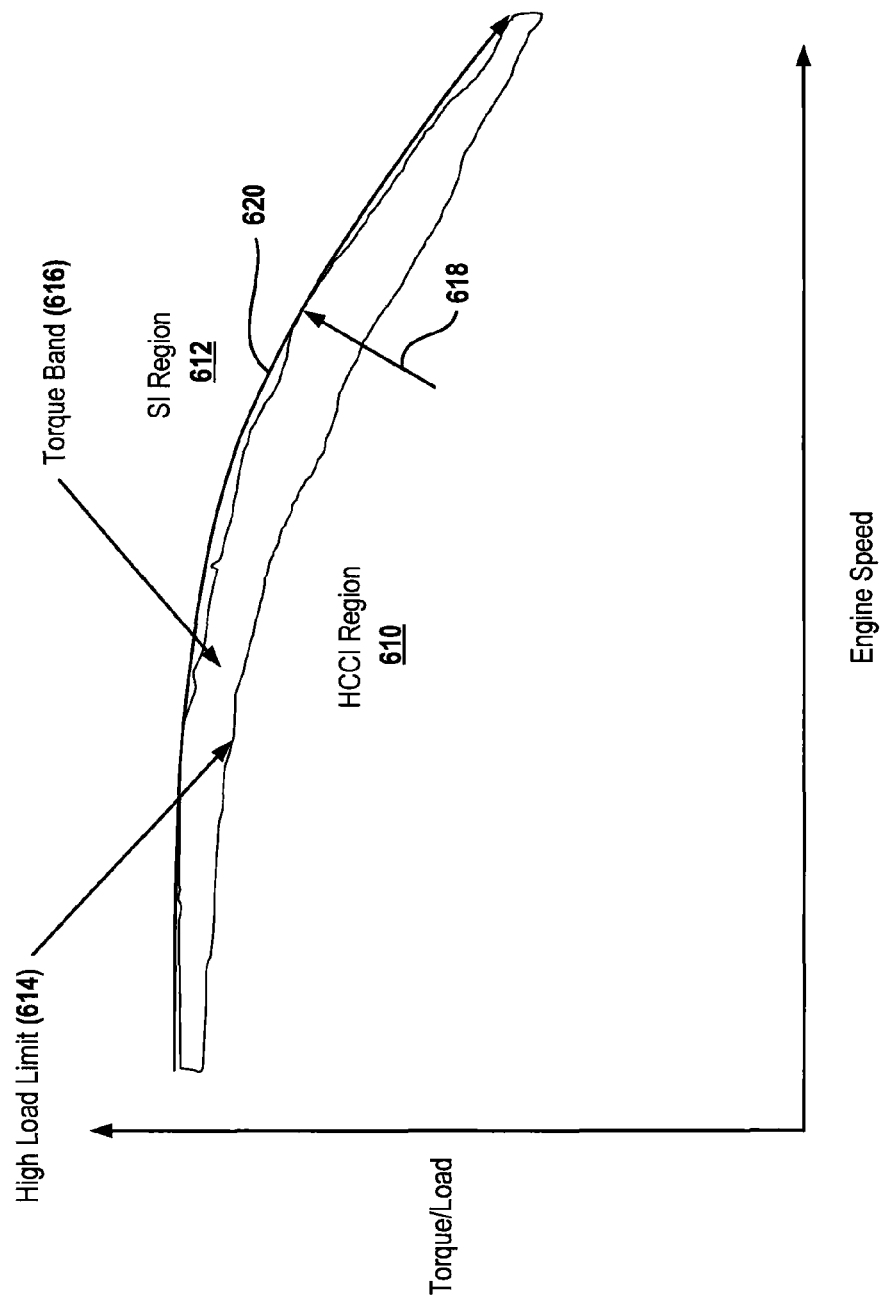
FIG. 3 is a plot of load versus engine speed illustrating an HCCI region, an SI region and a torque band between the HCCI region and the SI region.

Referring now to FIG. 3, a plot of torque or load versus engine speed is illustrated having an HCCI region 610 and an SI region 612. A torque band 616 is above an HCCI high-load limit 614 which defines the lower limit of the torque band 616. The upper limit of the torque band is line 620. As the torque/load and/or engine speed increases as indicated by arrow 618, the HCCI region is maintained within the torque band under the conditions described above. The torque band is provided to prevent rapid switching back-and-forth between the HCCI region 610 and the SI region 612. The torque band 616 prevents brief, unnecessary transitions and temporality allows HCCI operation to be maintained longer and thus emissions and fuel economy are improved in this region.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of controlling an engine comprising:
    operating the engine in a homogeneous charge compression (HCCI) mode;
    comparing an HCCI torque threshold, a desired torque amount and a torque threshold band;
    when the desired torque amount is less than the HCCI torque threshold, operating the engine in the HCCI mode;
    when the desired torque amount is greater than the HCCI torque threshold and outside of the torque threshold band, operating the engine in a spark ignition (SI) mode;
    while the desired torque amount remains within the torque threshold band for period less than a predetermined period, operating the engine in the HCCI mode; and
    when the desired torque amount remains within the torque threshold band for a period greater than the predetermined period, operating the engine in the SI mode.

2. A method of controlling an engine comprising:
    operating the engine in a homogeneous charge compression (HCCI) mode;
    determining a difference between a spark ignition (SI) torque threshold and a desired torque amount;
    when the difference is above a torque threshold band, operating the engine in a SI mode;
    when the difference is within the torque threshold band, operating the engine in the HCCI mode for a predetermined period; and
    initiating a counter when the difference is within the torque threshold band for a first time period.

3. The method of claim 2 further comprising updating the difference with a latest value and disregarding a previous value.

4. The method of claim 2 wherein if during the predetermined period the difference is above the threshold band, further comprising operating the engine in the SI mode.

5. The method of claim 2 wherein if during the predetermined period the difference is below the threshold band, further comprising operating the engine in an HCCI state.

6. The method of claim 2, further comprising resetting the counter when, during the predetermined period, the difference is above or below the torque threshold band.

7. The method of claim 2, further comprising incrementing the counter when, during the predetermined period, the difference is within the torque threshold band.

8. The method of claim 2 wherein operating the engine in the HCCI mode for the predetermined period while the difference is within the torque threshold band.

9. The method of claim 2 wherein determining the difference between the SI torque threshold and the desired torque comprises determining a difference between a desired fuel amount and an SI fuel threshold.

10. The method of claim 2 further comprising determining a desired torque or desired fuel in response to a pedal position.

11. The method of claim 2 further comprising determining a desired torque or desired fuel in response to a pedal position and additional loads.

12. The method as recited in claim 2 wherein the HCCI mode corresponds to a desired fuel or desired torque quantity as a function of engine speed.

13. The method of claim 2 further comprising determining the torque threshold band in response to one of vehicle speed or engine speed.

14. A control module for controlling an engine comprising:
    an HCCI mode control module that operates the engine in a homogeneous charge compression (HCCI) mode;
    a difference module that determines a difference between an HCCI torque threshold and a desired torque amount;
    a torque band calculating module that calculates a torque band;
    an SI mode control module that operates the engine in an SI mode when the difference is above a torque threshold band; and
    an HCCI mode control module that operates the engine in the HCCI mode when the desired torque is less than the HCCI torque threshold, and that, while the desired torque amount remains within the torque threshold band for a period less than a predetermined period, operates the engine in the HCCI mode,
    wherein the SI control module operates the engine in the SI mode if the desired torque amount remains within the torque threshold band for a period greater than the predetermined period.

15. The control module of claim 14 wherein the difference module updates the difference with a latest value and disregards a previous value.

16. The control module of claim 14 wherein the HCCI control module operates the engine in the HCCI mode for the predetermined period or until the difference is outside the torque threshold band.

17. The control module of claim 14 wherein the HCCI control module operates the engine in the HCCI mode when the difference is below the torque threshold band.

18. The control module of claim 14 wherein the difference module determines the difference between a desired fuel amount and an SI fuel threshold.

19. The control module of claim 14 wherein the desired torque or fuel is based upon a pedal position.

20. The control module of claim 14 wherein the desired torque or fuel is based upon a pedal position and additional loads.

21. The control module of claim 14 wherein the torque threshold band is based upon one of vehicle speed or engine speed.

* * * * *